(12) United States Patent
White

(10) Patent No.: US 7,387,314 B2
(45) Date of Patent: Jun. 17, 2008

(54) MULTI-CONFIGURABLE TRACTOR

(76) Inventor: Robert E. White, 16831 S. 164th St., Gilbert, AZ (US) 85297

( * ) Notice: Subject to any disclaimer, the term of this patent is extended or adjusted under 35 U.S.C. 154(b) by 323 days.

(21) Appl. No.: 11/054,581

(22) Filed: Feb. 9, 2005

(65) Prior Publication Data

US 2005/0189730 A1   Sep. 1, 2005

Related U.S. Application Data

(60) Provisional application No. 60/543,980, filed on Feb. 11, 2004.

(51) Int. Cl.
*B62D 21/00* (2006.01)
(52) U.S. Cl. .................................... 280/781
(58) Field of Classification Search .............. 180/906, 180/905, 900, 209, 21, 24.02; 280/287, 43.16, 280/785, 781, 796, 797, 124.123
See application file for complete search history.

(56) References Cited

U.S. PATENT DOCUMENTS

| 1,247,993 | A | 11/1917 | Olson |
| 1,678,411 | A | 7/1928 | Westmoreland |
| 2,119,800 | A | 6/1938 | Tull ........................... 280/106 |
| 2,605,113 | A | 7/1952 | Gilmore .................. 280/33.05 |
| 3,393,810 | A | 7/1968 | Craighead ...................... 212/1 |
| 3,570,614 | A | 3/1971 | Del Bagno .................... 180/1 |
| 3,578,089 | A | 5/1971 | Fischer et al. .............. 172/277 |

(Continued)

OTHER PUBLICATIONS

Smith, Darrell, All Traffic Runs in The Same Lanes; Farm Journal, Sep. 2004, pp. 14-18.

*Primary Examiner*—Faye M. Fleming
(74) *Attorney, Agent, or Firm*—Cahill, von Hellens & Glazer, PLC

(57) ABSTRACT

A tractor includes a motor, transmission, drive shaft and rear differential for driving the rear axles mounted on a main tubular frame of a variable configuration. Forwardly extendable telescoping tubular frame members are actuated by respective rams to selectively increase the wheel base between the front and rear wheels. The front and rear telescoping tubes supporting each of the wheels are selectively extendable to significantly increase the wheel width of the tractor; the axles for the rear wheels are commensurately extendable. A toolbar dependingly supported from the main frame in front of the cab permits the operator to view the operation of attached implements while driving. The toolbar may include a row guide causing the toolbar to move laterally as necessary to follow a row and the toolbar is connected to the steering mechanism to control the direction of travel of the tractor. The front wheels are pivotally mounted on the corresponding telescoping tubes to provide sufficient clearance to permit near 180° pivotal movement. The steering mechanism is capable of pivoting each front wheel through an angle of about 180° and establishes an appropriate geometric relationship between the front wheels to permit the tractor to turn about any center of rotation intersected by the common axis of rotation of the rear axle, including pivoting about either rear wheel, while maintaining the axis of rotation of each front wheel in intercepting relationship with the center of rotation. Moreover, the turn radius at the end of a row is minimal and can be further reduced by temporarily reducing the length of the frame. Various implements, including a toolbar, can be readily attached directly to the tubular frame at any location intermediate the front and rear axles, as necessary.

13 Claims, 12 Drawing Sheets

U.S. PATENT DOCUMENTS

| | | | |
|---|---|---|---|
| 3,774,690 A | 11/1973 | Booth | 172/126 |
| 3,802,716 A | 4/1974 | Wiers | 280/34 |
| 4,611,683 A * | 9/1986 | Hilmer | 180/209 |
| 4,639,008 A * | 1/1987 | Krettenauer et al. | 280/405.1 |
| 5,249,823 A * | 10/1993 | McCoy et al. | 280/656 |
| 5,901,800 A * | 5/1999 | Wilson et al. | 180/9.48 |
| 6,176,334 B1 * | 1/2001 | Lorenzen | 180/9.48 |
| 6,374,933 B1 * | 4/2002 | Ruppert et al. | 180/9.48 |

* cited by examiner

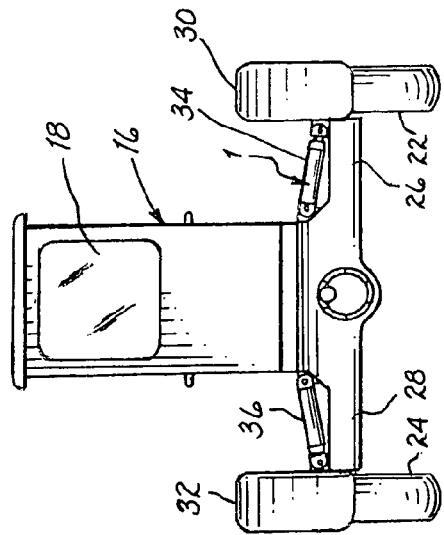
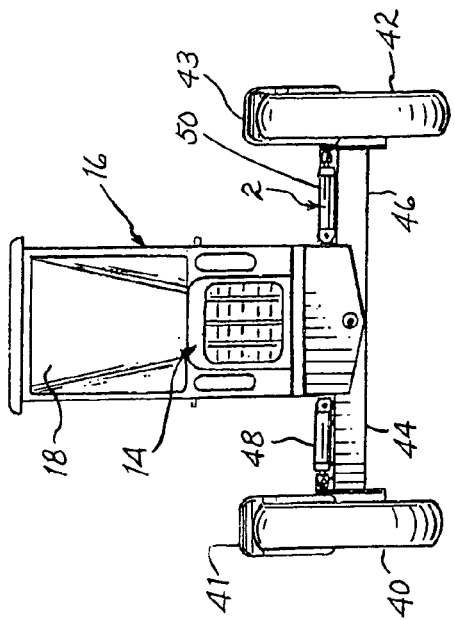
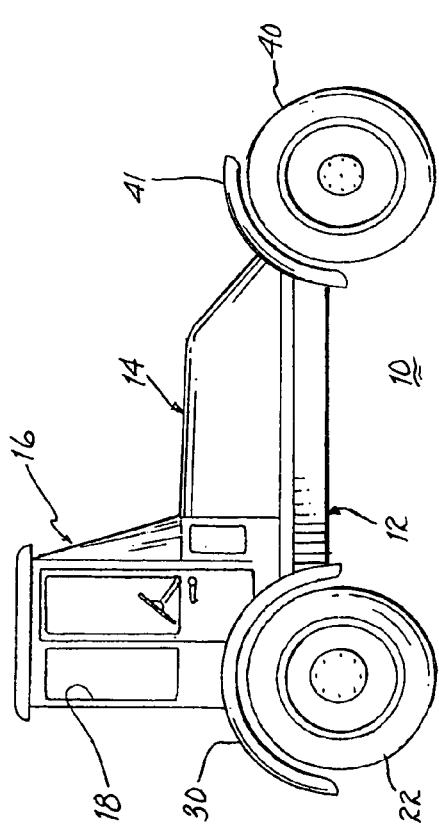
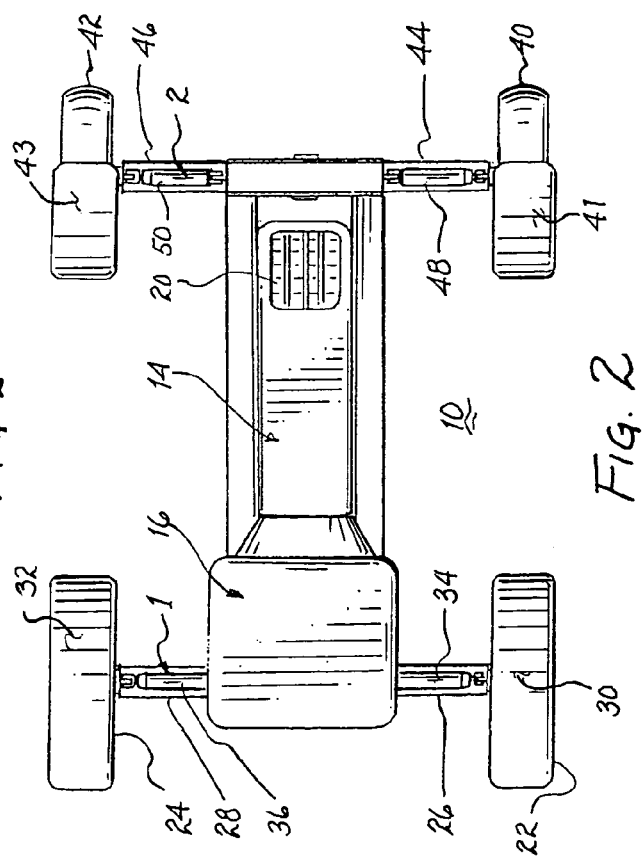

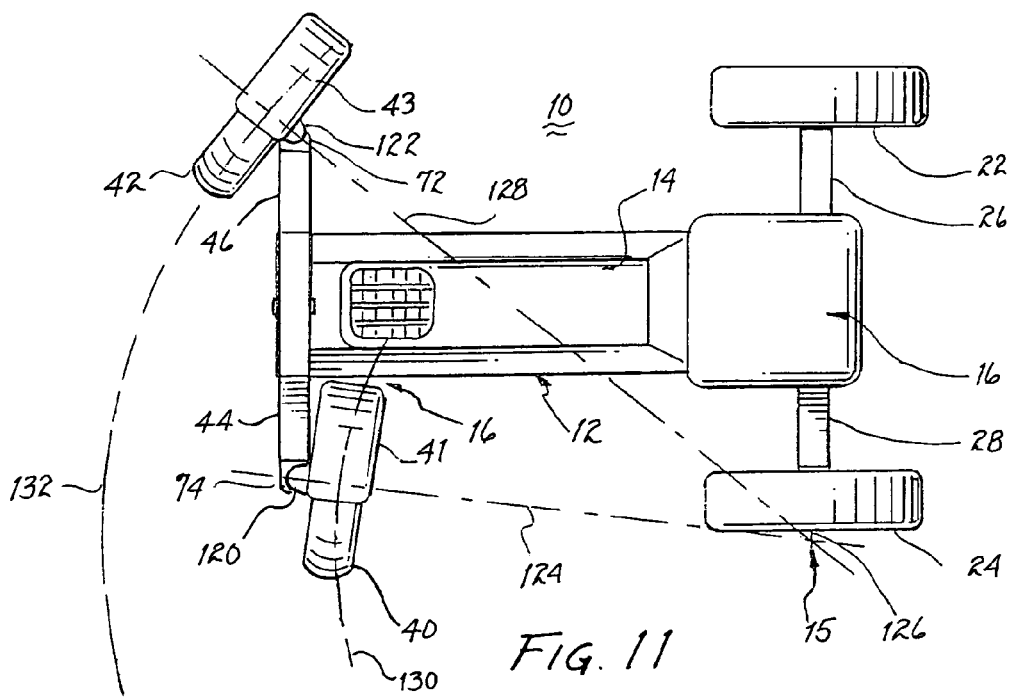
FIG. 11
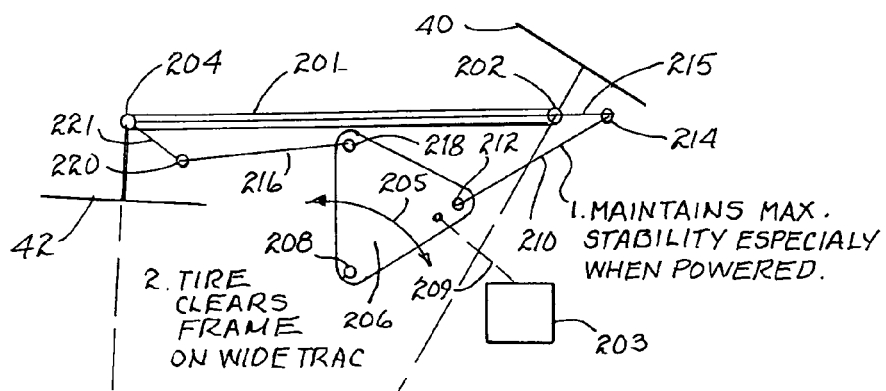
FIG. 12
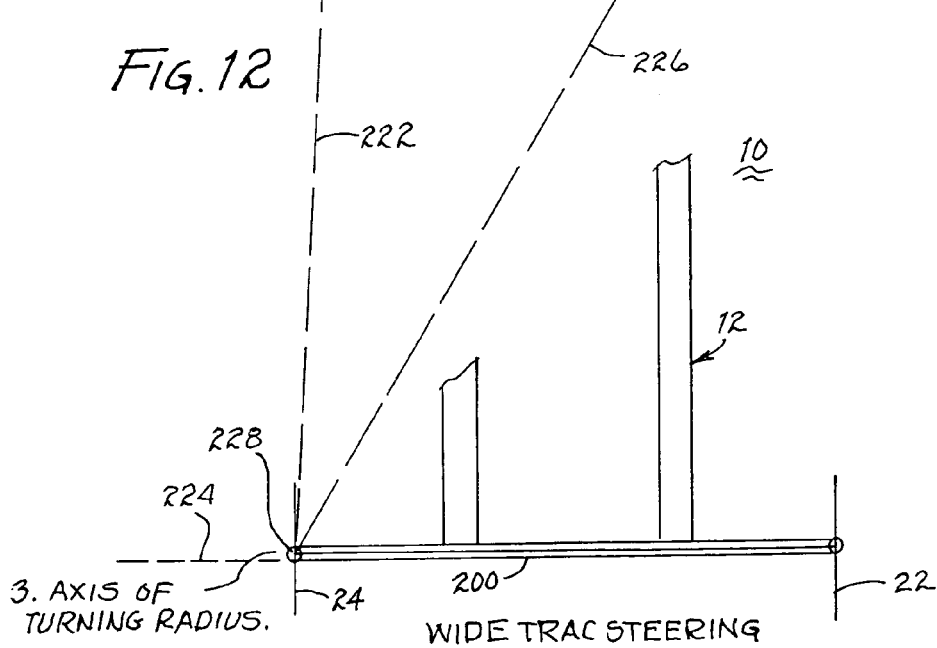
WIDE TRAC STEERING

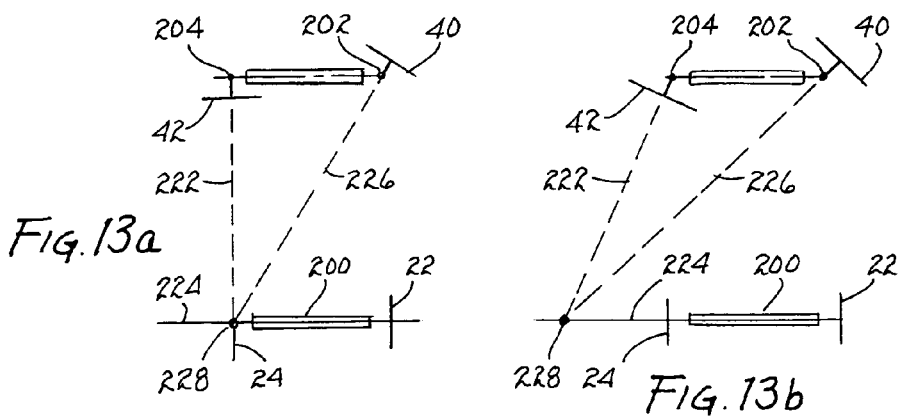
Fig.13a
Fig.13b
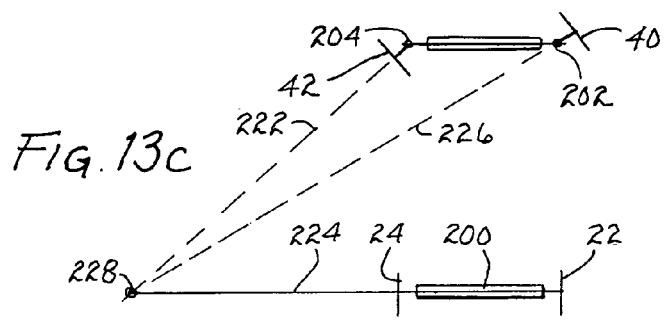
Fig.13c
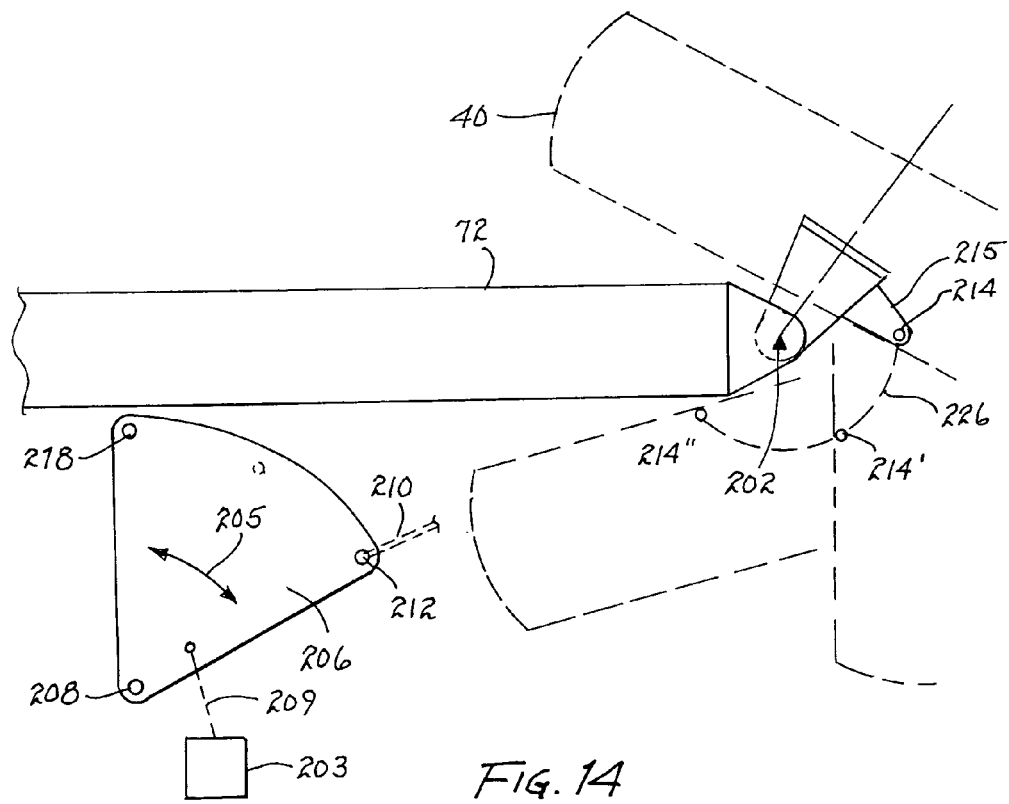
Fig.14
WIDE TRAC/AS 15

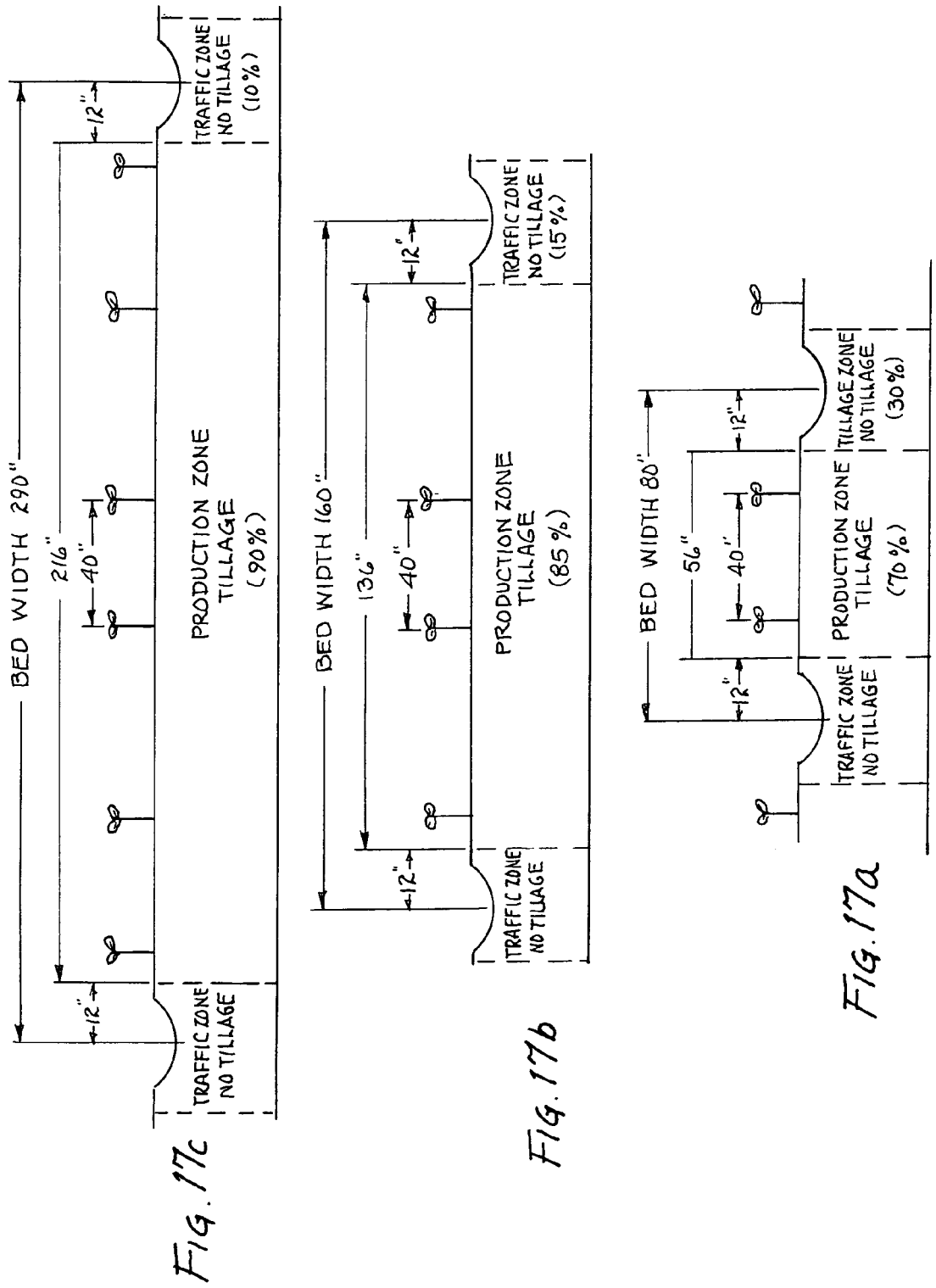

MULTI-CONFIGURABLE TRACTOR

CROSS-REFERENCE TO RELATED APPLICATIONS

The present application is related to and claims priority of a provisional application entitled "DIRECTIONAL CONTROL FOR A TRACTOR", filed Feb. 11, 2004, and assigned Ser. No. 60/543,980 and directed to an invention made by the present inventor.

BACKGROUND OF THE INVENTION

1. Field of the Invention

The present invention relates to tractors for use in farming operations and, more particularly, to tractors readily configurable to meet multiple unique operational requirements and to obtain the benefits therefrom.

2. Description of Related Prior Art

Conventional tractors of greater or lesser size have been used by farmers for decades to pull various implements and to perform various conventional farming operations. For the most part, these tractors are capable of performing the various operations required by a farmer but any reconfiguration, to the extent possible, requires relatively expensive implements and equipments available only from the manufacturer of the tractor. More specific inadequacies and limitations of conventional tractors will be summarized below.

The wheel width of conventional tractors is limited to the length of the associated fixed axles and the width of the tractor is fixed which creates burdens during transport of large tractors. The wheel hubs are fastened to a fixed axle and changing wheel centers is both time consuming and labor intensive. The front axle rocks on a center pin only which renders it impossible to raise one or the other front wheels to roll over obstacles or increase the weight on one or the other of the front wheels. The frame length of a tractor is fixed and by increasing the wheel width without lengthening the wheel base, crabbing results and some stability is lost. Because of the lack of uniformity of tractors from different manufacturers, equipment to be suspended beneath the tractor from the frame requires that each such piece of equipment be specifically designed for a particular tractor due to both the configuration of the frame and the often minimal ground clearance. Sometimes it is beneficial to add weight for traction and such weight must be added manually to a conventional tractor which is labor intensive and hard work. As the frame length of a conventional tractor is fixed, it cannot be shortened to obtain a smaller turning radius and thereby permit cultivation closer to the perimeter of a field. Conventional tractors provide traffic lanes of a two row width, which is an unavoidable limitation of the width of the root zone between the compacted traffic lanes. That is, the compacted traffic lanes create root barriers and reduce the yield.

The frames of most conventional tractors are of a monolithic design with cast-iron components attachable only at specific points of attachment. Thus, attachment of toolbars is generally restricted to front or rear fixed points. The power train components are unique to the configuration of the monolithic design and any repair or replacement requires expensive components available primarily only from the manufacturer of the tractor.

Because of limited clearance between the front wheels and the frame of a conventional tractor, the turning radius is limited. With such limitations and the geometry of conventional steering apparatus, the front wheels tend to plow in a turn and a true turning radius for each of the front wheels is not possible. Moreover, as the front wheels turn about a different point, one or both of the rear wheels may tend to plow or skid.

Toolbars are conventionally mounted at the rear of a tractor, which renders it difficult for an operator to visually monitor the toolbar and operation of the attached equipment. For harvesting and packaging purposes, it is beneficial to permit a farm hand to be on a work platform attached to a tractor but conventional tractors do not have such work platforms.

Conventional guidance systems cause a toolbar to shift and reliance is placed on the tractor to stabilize after such shift. This often causes the tractor to drift sideways.

The size of the tires used with conventional tractors generally cannot be changed. Thus, for greater traction, wider tires must be used or dual tires must be used. In the latter case, a much wider area is compacted to the detriment of crop yield. Usually, an auxiliary axle cannot be added to a conventional tractor to increase traction.

SUMMARY OF THE INVENTION

An agricultural tractor incorporates a steel tube frame having telescoping members to accommodate changes in length and, hence, the wheel base. Steel tubes with telescoping members support the front wheels. Steel tubes with telescoping members house telescoping axles supporting the rear wheels. Thereby, the length and width of the tractor may be modified without disturbing attachments to the frame or to the axles. All attachments to the frame, including motor and transmission mounts, tillage implements, hitches or brackets, are secured to the frame by means of clamping devices. Several implements may be attached to the full length of the frame as space allows and repositioned at will to accomplish multiple tillage processes during one pass through a field. Likewise, the drive train components, such as engine, transmission, hydraulic drive, etc., can be added, removed, replaced or repositioned without destroying the integrity of the frame. The steel tube frame is positioned at an elevation with sufficient ground clearance to permit implements to be mounted beneath the tractor and forward of the operator for better visibility. Placing an implement closer to the front axle makes it possible to till close to a field perimeter and permit smaller turns. The front wheel clearance in combination with the geometry of the steering mechanism permit turning the tractor about the center of either rear wheel or about any pivot point located on the axis of rotation of the rear wheels while providing a true turning radius for each of the wheels and thereby eliminate wheel plowing. By telescopic movement of the frame, the wheel width and wheel base may be adjusted to provide increased stability and permit use of wide tillage implements to create a more favorable distance between compacted wheel paths in a controlled traffic culture.

It is therefore a primary object of the present invention to provide a tractor having easily variable wheel width and wheel base.

Another object of the present invention is to provide telescoping tubes for the front wheels and telescoping tubes and axles for the rear wheels to accommodate changes in the width between the wheels.

Another object of the present invention is to provide a tubular frame for a tractor to accommodate attachment of various implements through use of clamps attachable to the frame or to any of the tubes supporting the wheels.

Another object of the present invention is to provide a true turning radius for each of the wheels to eliminate plowing of any of the wheels.

Still another object of the present invention is to provide a tractor frame permitting an underslung toolbar between the front and rear wheels.

Yet another object of the present invention is to provide a tractor having a turning radius about the center of either rear wheel.

A further object of the present invention is to provide a steering mechanism for a tractor responsive to a toolbar guided by a row guide.

Still another object of the present invention is to provide sufficient clearance for use of large diameter front wheels for steering while maintaining a true turning radius.

Yet another object of the present invention is to provide the capability for attaching an auxiliary axle to a tractor.

Yet another object of the present invention is to provide an adjustable width between the front and rear wheels to increase the width between soil compaction.

A yet further object of the present invention is to provide controlled traffic by guiding a tractor along established furrows.

A yet further object of the present invention is to provide a method for reconfiguring and for guiding a tractor along a controlled path.

A yet further object of the present invention is to provide a method for preventing plowing of any of the wheels during a turn of any radius.

A yet further object of the present invention is to provide a method for aligning a tractor with the traffic lanes through a lateral shift of the rear wheels.

A yet further object of the present invention is to align an underslung toolbar located between the front and rear wheels of a tractor with an implement by sideways movement of the tractor.

These and other object of the present invention will become apparent to those skilled in the art as the description proceeds.

BRIEF DESCRIPTION OF THE DRAWINGS

The present invention will be described with greater specificity and clarity with reference to the following drawings, in which:

FIG. 1 illustrates a representative side view of a tractor embodying features of the present invention;

FIG. 2 is a representative top view of the tractor shown in FIG. 1;

FIG. 3 is a representative rear view of the tractor shown in FIG. 1;

FIG. 4 is a representative front view of the tractor shown in FIG. 1

FIG. 11 illustrates the configuration of the front wheels during a turn about a pivot point on the common axis of rotation of the rear wheels and adjacent the rear wheel;

FIG. 12 illustrates the geometry of the steering mechanism to accommodate true turns of the tractor;

FIGS. 13a, 13b and 13c representatively illustrate the configuration of the wheels during turns about various pivot points on the common axis of rotation of the rear wheels;

FIG. 14 illustrates the steering mechanism and pivotal movement of a front wheel and FIG. 14a illustrates a power assist feature acting on the steering mechanism.

FIGS. 17a, 17b and 17c show the increased yield available upon different extensions of the width between the front and rear wheels of a tractor;

DESCRIPTION OF THE PREFERRED EMBODIMENT

Figure 4A:
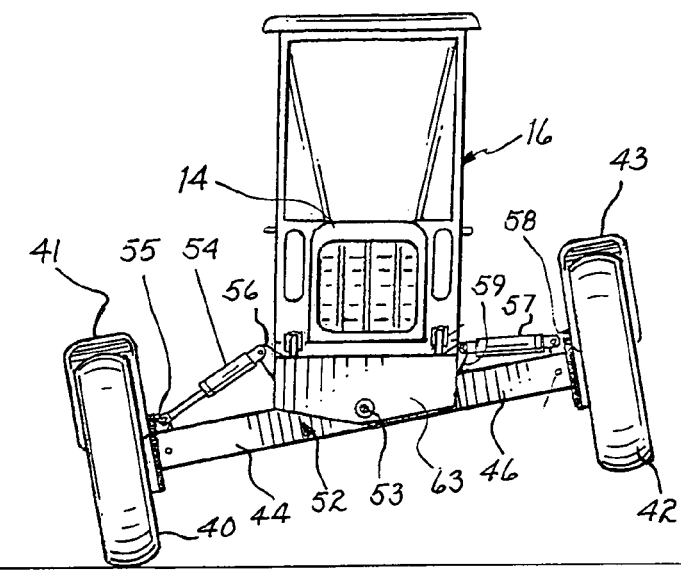
FIG. 4a illustrates vertical repositioning of either front wheel.

Referring to FIGS. 1, 2, 3 and 4 there is shown an agricultural tractor 10 embodying the present invention. The chassis of the tractor is formed of a tubular steel frame 12 upon which are mounted the conventional motor, transmission, steering mechanism and various ancillary components. A hood 14 shields the motor and its various components. A cab 16 encloses the operator and includes a plurality of windows 18 to provide visibility forward, backward and to the sides. Hood 14 may include a grill 20 or the like to provide cooling air to the motor within the hood. Rear wheels 22, 24 are supported by respective telescoping axles enclosed within telescoping steel tubes 26, 28, respectively. Fenders 30, 32 may be mounted above the rear wheels to prevent splatter of mud and the like. Extension and contraction of telescoping tubes within tubes 26, 28 is controlled by hydraulic rams 34, 36. Front wheels 40, 42 are pivotally mounted and coupled with a steering mechanism, as will be described in further detail below. The pivot mechanism for each wheel is supported by a telescoping tube extendable from each of steel tubes 44, 46. The extension and contraction of these telescoping tubes is controlled by hydraulic rams 48, 50. To reduce splatter of mud and the like, fenders 41, 43 may be incorporated, as illustrated.

FIG. 4a illustrates tubes 44, 46 formed in the manner of a unitary hollow bar 52 pivotally secured to support 63 by a pivot mechanism 53. A hydraulic ram 54 interconnects a flange 55 extending from tube 44 (bar 52) with an anchor 56 attached to frame 12. A further hydraulic ram 57 interconnects a flange 58 extending from tube 46 (bar 52) with an anchor 59 attached to frame 12. By operation of the hydraulic rams one or the other front wheel can be raised for the purpose of increasing the weight on the other wheel or for the purpose of over riding an obstacle. It is to be noted that each of tubes 44, 46 may be independently pivotally attached to support 63 and yet provide the same benefit of selectively raising either front wheel.

Figure 5A:
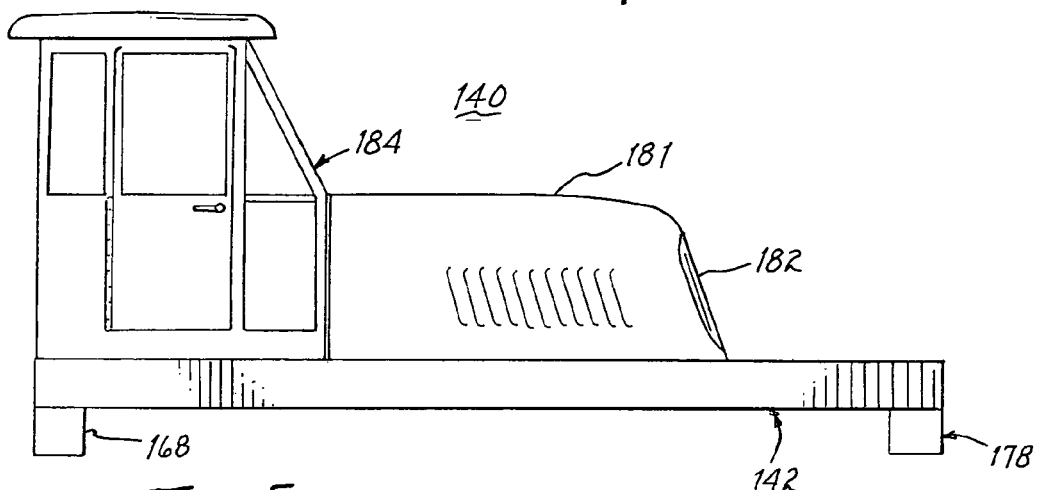
FIG. 5a is a partial side view of the tractor illustrating representative dimensions.
Figure 5B:
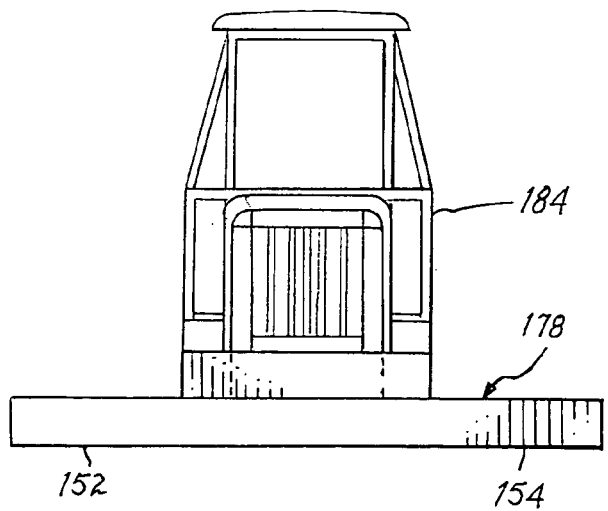
FIG. 5b is a representative front view of the tractor illustrating representative dimensions and a tube for supporting telescoping tubes extendable therefrom.
Figure 5C:
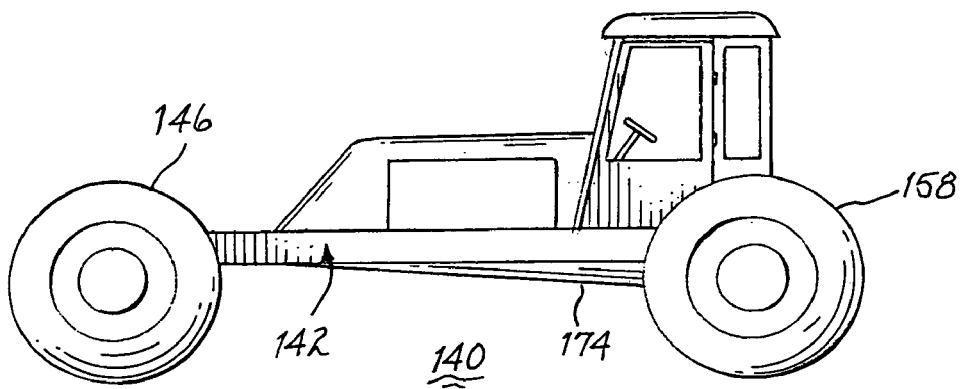
FIG. 5c is a side view of large sized wheels mounted on a tractor.
Figure 5D:
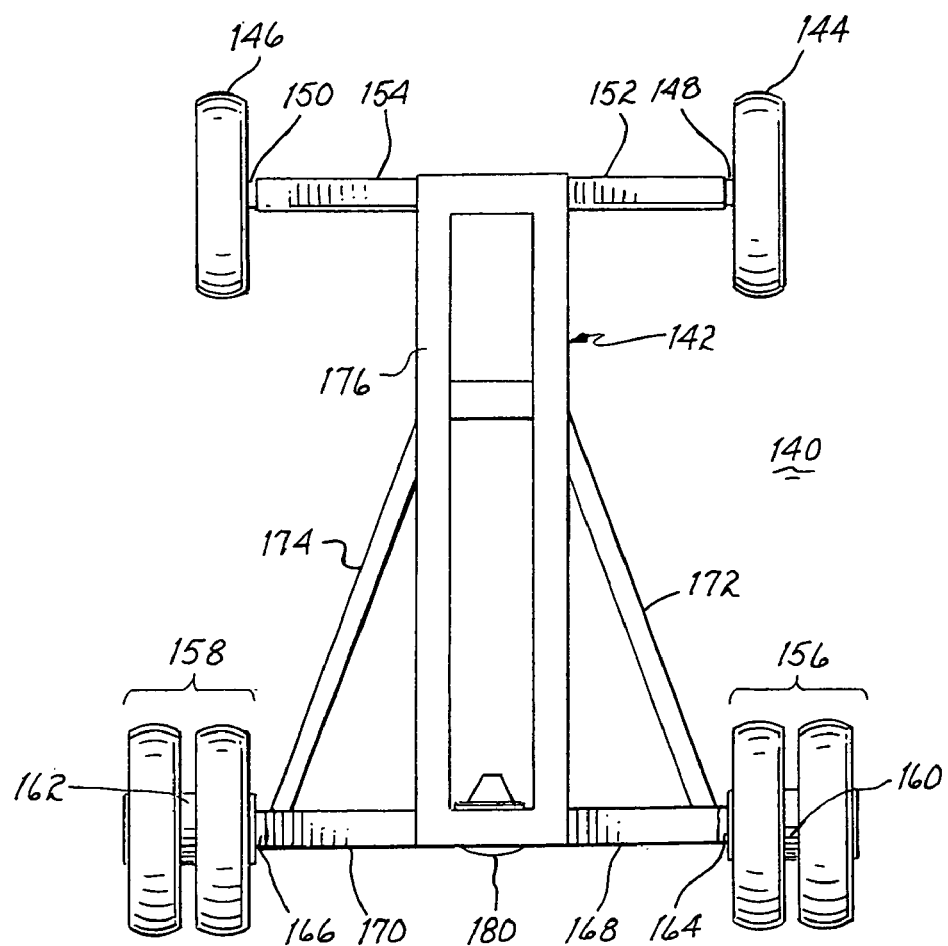
FIG. 5d is a top view illustrating the frame of the tractor shown in FIG. 5c and showing dual rear wheels.
Figure 5E:
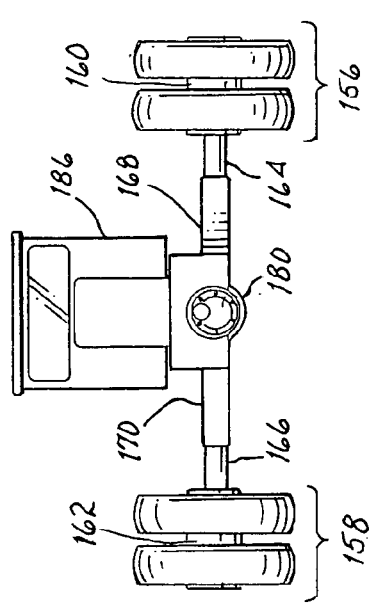
FIG. 5e is a rear view of the tractor shown in FIG. 5d.
Figure 5F:
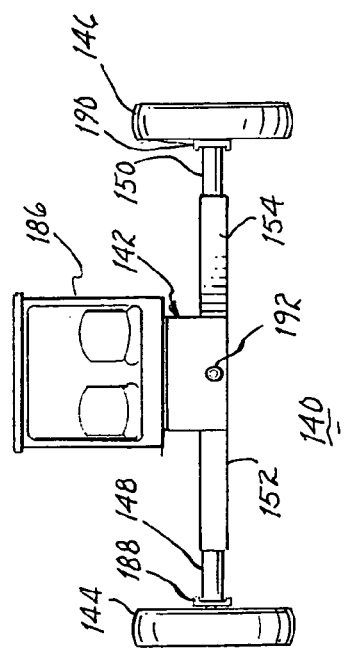
FIG. 5f is a front view of the tractor shown in FIG. 5e.

Referring jointly to FIGS. 5a, 5b, 5c, 5d, 5e and 5f, a heavy duty tractor 140 will be described. This tractor includes all of the features attendant tractor 10 and the components thereof may be more robust to meet the strength and durability requirements commensurate with the environment and work load in which such a tractor would be used. The tractor includes a frame 142 of large sized square steel tubing commensurate with the expected loads. As described above, such square tubing permits the use of clamps disposed at various locations on the frame to support ancillary equipment. Large sized front wheels 144, 146 are pivotally mounted to telescoping tubes 148, 150, respectively. These tubes are slidably extendable from and retractable into fixed tubes 152, 154, as described above. The lengths of these fixed tubes are sufficient to permit pivotal movement of the front wheels through an angle approaching 180° to provide the tightest turns possible without having any of the wheels plow or scrub the ground. Large sized dual rear wheels 156, 158 are mounted upon respective hubs 160, 162 in the conventional manner. These hubs are attached to telescoping tubes 164, 166 slidably extendable from and retractable into fixed tubes 168, 170 forming a part of frame 142. To add further robustness to frame 142, braces 172, 174, formed of steel tubing, extend from main frame 176 to locations in proximity to the respective terminal ends of tubes 168, 170, respectively. Tubes 152, 154 may be separately pivotally attached to main frame 176 or they may be a continuous bar or tube 178 as depicted in FIGS. 5a and 5b. A differential unit 180 is coupled intermediate tubes 168, 170 to provide rotational power to the axles driving dual wheels 156, 158 which axles are mounted within the tubes and the telescoping tubes and can be telescoped to extend and retract commensurate with the telescoping tubes. Clearly, the drive shaft from a motor mounted on frame 142 would be connected to the differential unit through an appropriate transmission, as is well known. A hood 181 and a grill 182 provide protection for the motor enclosed therewithin. A cab 184 is for use by an operator and includes the various controls necessary to operate tractor 140. This cab may be for use by a single operator, as primarily shown in FIGS. 5a, 5b and 5c. Alternatively, the cab may be configured as cab 186 for use by two operators, as shown in FIGS. 5e and 5f.

As particularly shown in FIGS. 5e and 5f, dual rear wheels 156, 158 are extendable by extending telescoping tubes 164, 166 with respect to tubes 168, 170, respectively. Thereby, the width between these wheels can be extended from two rows of crops to four rows of crops. Front wheels 144, 146 are similarly extendable by extending telescoping tubes 148, 150 from their respective tubes 152, 154. Such extension and subsequent retraction may be accomplished by hydraulic rams, as described above.

Front wheel 144 includes a pivot member 188 to accommodate pivotal movement of the wheel through an angle approaching 180°. Similarly, a pivot member 190 accommodates pivotal movement of wheel 146 through an angle approaching 180°. A pivot mechanism 192 is formed as part of frame 142. The function and purpose of pivot mechanism 192 is that of accommodating vertical pivotal movement of either of tubes 152, 154. Such pivotal vertical movement is controlled by a hydraulic ram or the like. Thereby, the load on either front wheel may be reduced by raising the front wheel or a front wheel may be raised to avoid or roll over an obstacle. If tubes 152, 154 are formed as a hollow bar, the bar would be vertically pivotable about pivot mechanism 192.

Figure 6:
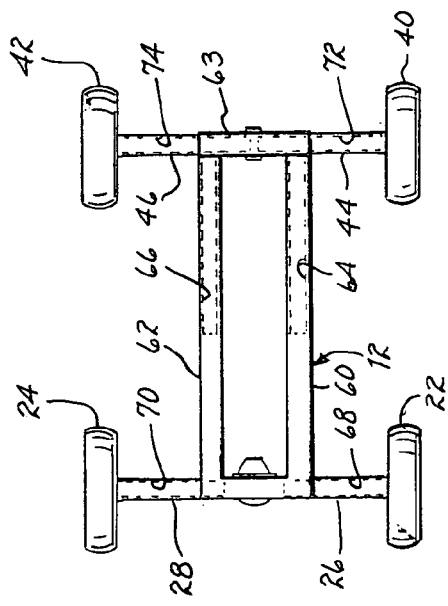
FIG. 6 illustrates the extendable frame of the tractor illustrated in FIG. 1 and showing the retracted configuration.
Figure 7:
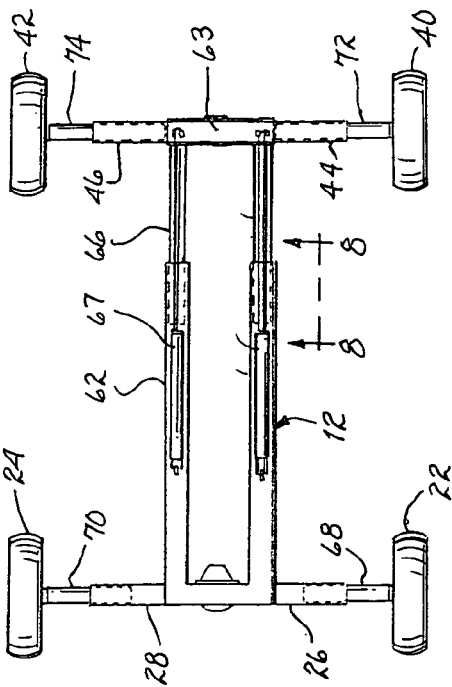
FIG. 7 illustrates the extendable frame of the tractor shown in FIG. 1 and illustrating the frame in its extended configuration.

Referring to FIGS. 6 and 7, extension of the wheels to vary the width between the wheels and extension of the frame to vary the wheel base will be described. Frame 12 includes longitudinal steel tubes 60, 62 coupled with rear tubes 26, 28. A telescoping tube 64 is slidably disposed within tube 60 and coupled with a support 63 for front tube 44. Telescoping tube 66 is slidably disposed within tube 62 and coupled with support 63 for front tube 46. Upon extension of telescoping tubes 64, 66 in response to respective hydraulic rams 65, 67, the wheel base may be extended, as illustrated in FIG. 7. A telescoping tube 68 is slidably located within rear tube 26. Telescoping tube 70 is slidably located within rear tube 28. Upon actuation of hydraulic rams 34, 36 (as shown in FIG. 2), the width between rear wheels 22, 24 may be increased, as shown in FIG. 7. Telescoping tube 72 is slidably disposed within front tube 44. Telescoping tube 74 is slidably disposed within front tube 46. Upon actuation of hydraulic rams 48, 50 (see FIG. 2), the width between wheels 40 and 42 may be increased, as illustrated in FIG. 7.

With such extendable tubes (and axles) it is relatively easy to rapidly modify the tractor for use in conjunction with different row widths in a field. The ability to extend the frame fore and aft has several important advantages. With wider wheel width an extended frame will maintain the stability of the tractor. When the front wheels are extended forwardly, additional leverage is provided to compensate for the torque at the rear wheels that might otherwise cause the tractor to tip backwards. Moreover, the weight distribution between the front and rear wheels is enhanced and the additional lever arm for the weight of the front wheels will counter the torque at the rear wheels. On approaching the edge of a field, the length of the frame can be shortened to reduce the turn radius and increase the area of cultivation. For transport purposes, both the length and width of the tractor can be minimized by reducing the length and width relatively rapidly.

Figure 8:
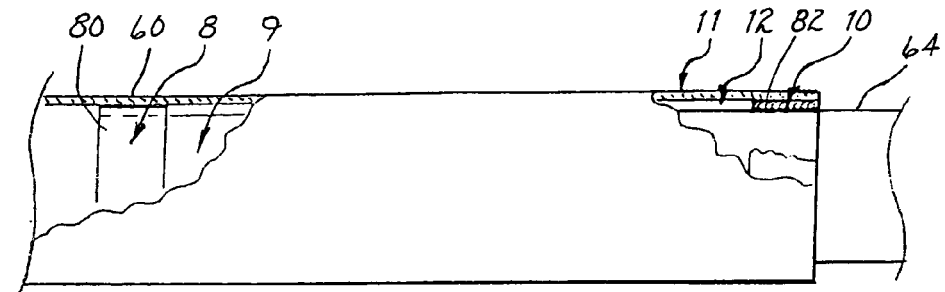
FIG. 8 is a partial cross sectional view taken along lines 8-8, as shown in FIG. 7.

FIG. 8, which is a partial cross sectional view taken along line 8-8, as shown in FIG. 7, is a representation of the interconnection between a fixed tube and a telescoping tube. In particular, telescoping tube 60 may include a collar 80 of low friction material disposed about the end of the telescoping tube. This collar bears against and is in slidable engagement with the interior surface of tube 60 to reduce the friction upon sliding movement between tube 60 and telescoping tube 64. A further collar 82 of low friction material may be attached to the interior surface at the open end of tube 60 to bear against and in slidable engagement with telescoping tube 64. Tube 62 and telescoping tube 66 have similar low friction elements therebetween. Thereby, collars 80 and 82 provide a low friction engagement between tube 60 (62) and telescoping tube 64 (66) during extension and retraction of the telescoping tubes. Similar low friction interconnections may be embodied in front tubes 44, 46 and their respective telescoping tubes 72, 74 and rear tubes 26, 28 and their respective telescoping tubes 68, 70.

Figure 9:
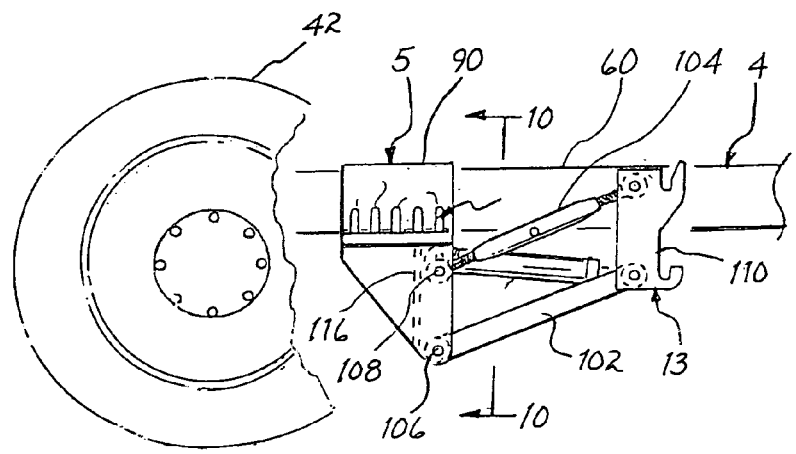
FIG. 9 is a side view of a clamp attachable to the frame along with an element supported by the clamp.
Figure 10:
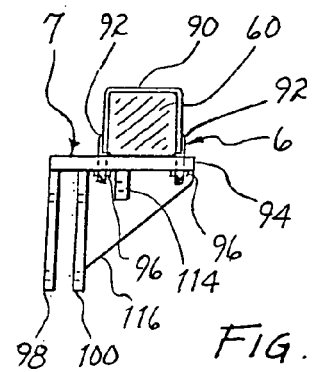
FIG. 10 is a cross sectional view taken along lines 10-10, as shown in FIG. 9.

The benefit of using square tubing to construct frame 12 is particularly illustrated in FIGS. 9 and 10. An agricultural tractor is a relatively expensive piece of equipment and therefore must be able to perform a number of different functions when working a field. Such multitude of functions generally requires different pieces of equipment to be attached to the tractor. These various pieces of equipment are usually available from the manufacturer of each brand of tractor. However, such pieces of equipment tend to be useable only with a particular brand of tractor and the pieces of equipment are relatively expensive. By constructing the tractor to be capable of having attached thereto pieces of equipment from any of various tractor manufacturers or generic pieces of equipment would be very beneficial and cost effective.

By forming frame 12 of standard sized steel tubes, clamps may be attached to essentially any location of interest along the frame. One type of such a clamp mounted rearwardly of each of front wheels 40, 42 is illustrated in FIGS. 9 and 10. An inverted U-shaped fitting 90 envelopes three sides of a tube, such as tube 60. Threaded shafts 92 are welded to the exterior of the side walls of fitting 90 and extend therefrom for a distance. A plate 94 includes a plurality of holes for penetrably receiving each of threaded shafts 92. As particularly illustrated in FIG. 10, plate 94 bears against the bottom surface of tube 60 and is secured by a nut 96 engaging each of threaded shafts 92 to draw the plate against tube 60 to rigidly attach the clamp to the tube. Plate 94 serves as the base or foundation for any of various elements to be supported by fitting 90. For example, a pair of supports 98, 100 may be welded or otherwise attached to the undersurface of plate 94. These supports provide a mounting for a pivotally attached pair of links 102, 104 pivotally mounted upon bolts 106, 108 or the like journalled or otherwise attached to supports 98, 100. As shown, link 104 may be a turn buckle to provide adjustment of the angle of a supported mounting 110 for a piece of equipment. A hydraulic ram 112 interconnects with mounting 110 and an anchor 114 depending from plate 94. By extension and retraction of the hydraulic ram, links 102, 104 will be caused to pivot about respective bolts 106, 108 to raise or lower mounting 110. In view of the loads that may be imposed by the piece of equipment attached to mounting 110, a gusset 116 may be welded between plate 94 and support 100.

Figure 10A:
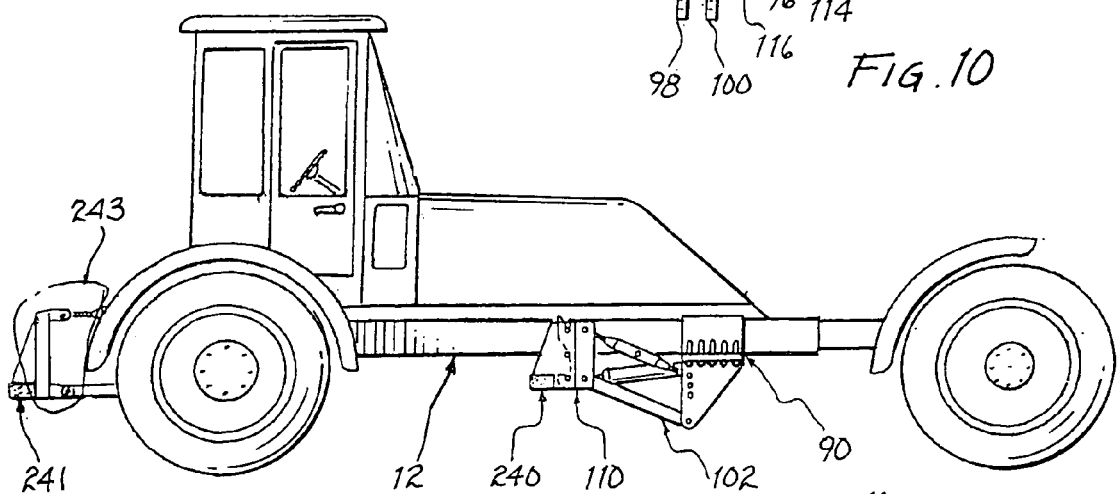
FIGS. 10a and 10b illustrate detachable attachment of a toolbar between the front and rear wheels.
Figure 10B:
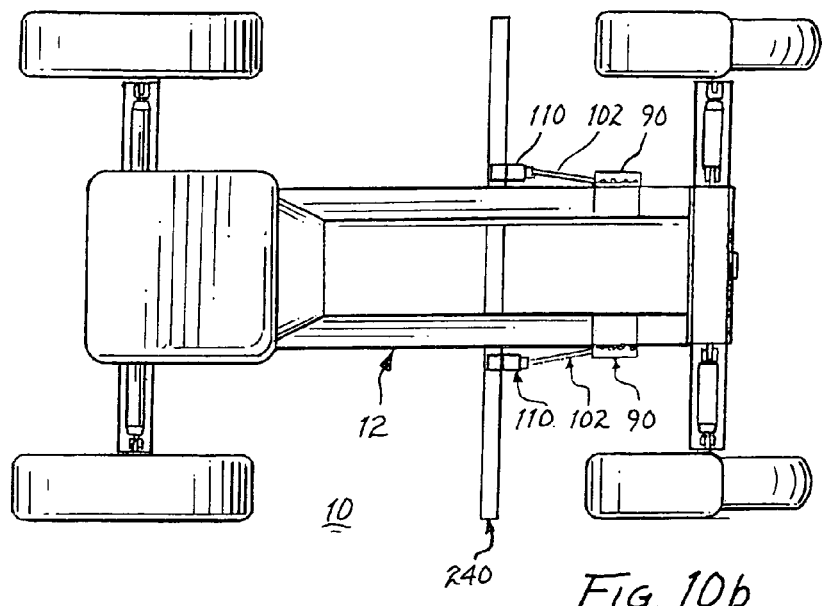

FIG. 10a is a side view illustrating suspension of a toolbar 240 from each of mountings 110 on opposed sides of frame 12. FIG. 10b illustrates a top view of the suspended toolbar. Cultivating tools can be attached to toolbar 240 in the conventional manner. With such attachment of the cultivating tools, an operator in cab 16 can easily view operation of the cultivating tool and take any action necessary to insure continuing and proper operation. This is not as easily possible when a toolbar 241 is mounted at the rear of the tractor, as shown in FIG. 10a. However, for some cultivating tools it may be preferable to attach them to rear toolbar 241. The rear toolbar is attached to frame 12 by linkages and hydraulic rams, identified representatively by numeral 243. By operation of these linkages and hydraulic rams, the toolbar can be raised and lowered, including lowering the toolbar to the ground and raising the rear of the tractor and either or both rear wheels.

Figure 10C:
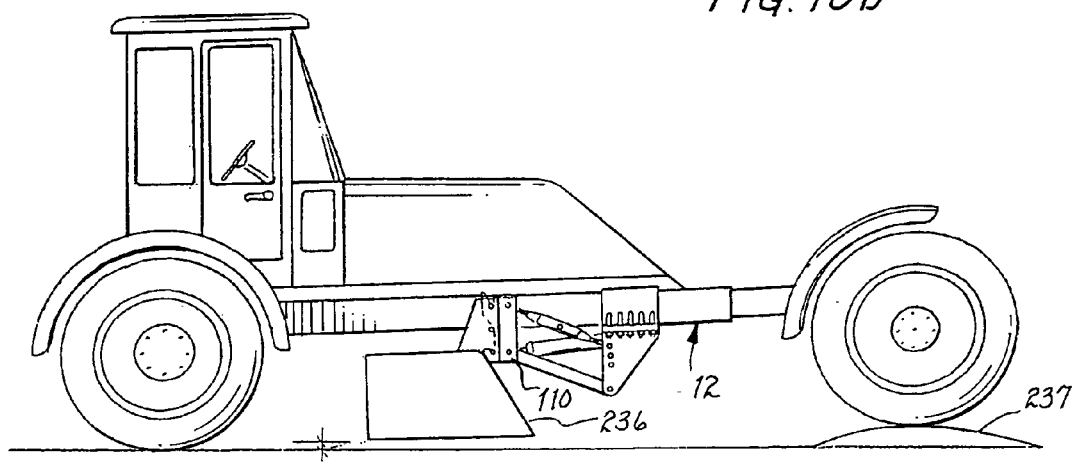
FIGS. 10c and 10d illustrate attachment of a scraper to the toolbar and its operation.
Figure 10D:
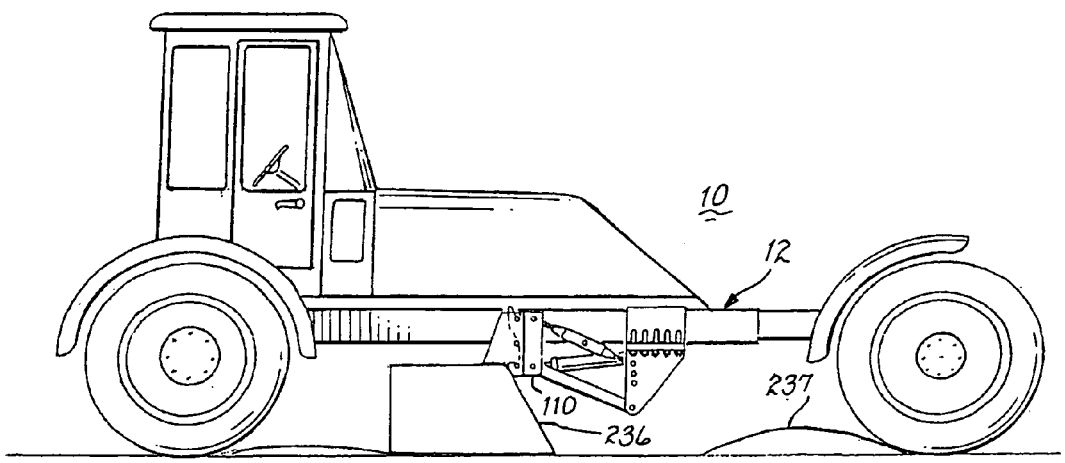

FIG. 10c illustrates a scraper 236 suspended to mountings 110 located on the toolbar on each side of frame 12 to position the scraper between the front and rear wheels. With such positioning, the dirt can be bladed off and spread evenly. When the front wheels encounter uneven ground, represented by mound 237, the edge of the scraper will rise only a fraction of the height of the mound. For example, if the wheel base of the tractor is 22 feet and the rear edge of the scraper is 16 feet behind the center of the front wheels, the scraper will rise only 2⅛ inches even though the mound may be 8 inches high. At each succeeding pass, the elevation or height of the mound will be reduced, as shown in FIG. 10c. A scraper that is supported from a rear mounted toolbar 241 (see FIG. 10a) is far less efficient in leveling the ground. For example, as the front wheels of the tractor rise over a mound, the scraper will cut below grade. As the rear wheels rise over a mound, the scraper will rise even higher. These detrimental height changes of a rear mounted scraper are usually resolved by the operator raising and lowering the scraper, which is man power intensive and relies upon the skill of the operator to achieve a level ground.

Referring to FIG. 11, features relating to the turning radius of tractor 10 (as well as tractor 140) will be described. Tubes 44, 46 extend a sufficient distance from frame 12 to accommodate pivotal movement of front wheels 40, 42 through an angle approaching 180°. More particularly, pivot support 120, pivotally attaching wheel 40 to the terminal end of telescoping tube 74 is located by the length of tube 44 a sufficient distance from frame 12 when the telescoping tube is in the fully retracted position to permit the axis of rotation 124 of front wheel 40 to essentially intersect axis of rotation 126 of rear wheels 22, 24 adjacent the outer hub of the rear wheel, as illustrated. Similarly, pivot support 122, attached to the terminal end of telescoping tube 72 will permit pivotal movement of wheel 42 to a degree sufficient to permit axis of rotation 128 of the wheel to intersect axis of rotation 124 of front wheel 40 at a point on the common axis of rotation 126 of the rear wheels and adjacent the hub of rear wheel 24. As a result, wheel 40 will travel along a circular path 130 centered upon the intersection of axis of rotation 124 and axis of rotation 126. Similarly, wheel 42 will travel along a circular path 132 having a center coincident with the intersection of axis of rotation 128 with axis of rotation 126. As wheels 40 and 42 will travel along their respective circular paths, neither wheel will plow nor skid, as is common with conventional tractors. Moreover, rear wheels 22, 24 will travel along a circular path centered upon the intersection of axis of rotation 124, 126 and 128. Thus, these rear wheels will not plow nor skid during a turn.

It is to be noted that FIG. 11 illustrates an extremity of the turn of tractor 10. For less severe turns, the geometry of the steering mechanism attendant front wheels 40, 42 will result in the respective axis of rotation of the front wheels intercepting common axis of rotation 126 of the rear wheels at a location a greater or lesser distance from the respective rear wheel at the inside of the turn.

Referring jointly to FIGS. 12, 13a, 13b and 13c, details of the steering mechanism and the locus common to the axis of rotation of each of the front wheels and the rear wheels will be described. Frame 12 of the tractor supports, within tubes 26, 28 and telescoping tubes 68, 70, axles for the rear wheels that are representatively shown in FIG. 12 and identified by numeral 200. Rear wheels 22 and 24 are representatively shown attached to axle 200. The longitudinal axis of the axle 200 corresponds with the axis of rotation of the rear wheels, as is conventional. Front wheels 40 and 42 are pivotally attached to the respective telescoping tubes shown representatively as a tube identified by reference numeral 201 by pivot mechanisms 202 and 204. These pivot mechanisms are located at the terminal ends of the telescoping tubes described above. The steering mechanism for tractor 10, as well as tractor 140, and identified representatively by box 203 can produce pivotal movement, as represented by arrow 205, of a plate 206, or the functional equivalent, about a pivot axis 208 by extension and retraction of a link 209 (or the like). A link 210 is pivotally attached to plate 206 at pivot point 212 close to an apex of plate 206 and pivotally attached to pivot mechanism 202 at point 214 via a tang 215. A further link 216 is pivotally attached to plate 206 at point 218 close to an apex of plate 206 and to pivot mechanism 204 at point 220 via a tang 221.

Referring jointly to FIGS. 12, 13a, 13b and 13c, the geometry of the wheels and the corresponding turning radii will be described in further detail. At the extreme left turn position, shown in FIGS. 12 and 13a, axis of rotation 222 of front wheel 42 essentially intersects the common axis of rotation 224 of rear wheels 22, 24 at the hub of wheel 24. Axis of rotation 226 of front wheel 40 also intersects axes of rotation 222. As the common axis of rotation 224 of rear wheels 22 and 24 extends through this point of intersection, forward turning motion of tractor 10 (or 140) will be about a vertical axis at the hub of wheel 24. The resulting turning motion of tractor 10 (or 140) will cause each of wheels 22, 40 and 42 to travel a circular path having a common center and rear wheel 24 will rotate about a vertical axis. Accordingly, little plowing or scrubbing of any of the wheels will occur.

For a less sharp turn, as illustrated in FIG. 13b, point of intersection 228 will be laterally displaced along common axis of rotation 224 of the rear wheels. Nevertheless, each of rear wheels 22, 24 and front wheels 40, 42 will define a circular path having common centers at the point of intersection of the respective axis of rotation. For an even less sharp turn, as shown in FIG. 13c, point of intersection 228 is yet further laterally removed along common axis of rotation 224 of the rear wheels. Yet, each of rear wheels 22, 24 and front wheels 40, 42 will travel along a circular path having a common center represented by this point of intersection 228. While turning has been illustrated as only occurring to the left, it is to be understood that the same geometry would be present for a right turn.

FIG. 14 illustrates the above-described near 180° degree turning capability of front wheel 40. It is to be understood that front wheel 42 has the same capability. Moreover, this drawing illustrates a further detail of pivot mechanism 202 attached to the terminal end of telescoping tube 72. As described above, plate 206, or its functional equivalent, rotates about pivot axis 208 in response to an input from the steering mechanism, represented by box 203 and link 209. Link 210, pivotally attached at point 212, is pivotally attached to point 214 representatively illustrated as a location on a tang 215 connected with pivot mechanism 202. Point 214 swings about an arc 226 as a function of the pivotal position of plate 206. In the position illustrated, point 214 would be at the extremity of travel resulting in wheel 40 being rotated to its full left turning position. As plate 206 rotates counterclockwise (to the left) in response to operation of the steering wheel and steering mechanism 203 of the tractor, point 214 becomes relocated to the location identified by numeral 214'. In this position, wheel 40 is aligned fore and aft and plate 206 is centered. As plate 206 is moved further to the left by action of the steering mechanism, point 214 is repositioned to the position identified by numeral 214", which corresponds to a hard right turn of wheel 40. It is to be understood that link 210 (and link 216 shown in FIG. 12) would be extendable and contractable as a function of the extension and contraction of the telescoping tubes associated with the front wheels in order to maintain the geometry intact.

FIG. 14a primarily illustrates the use of hydraulic rams 232, 234 anchored to the frame, such as support 63, and actuatable to rotate arm 236. The arm is attached to plate 206 and rotates about pivot axis 208. Thereby, the steering mechanism, represented by box 203, can have a power assist to turn front wheels.

Figure 15:
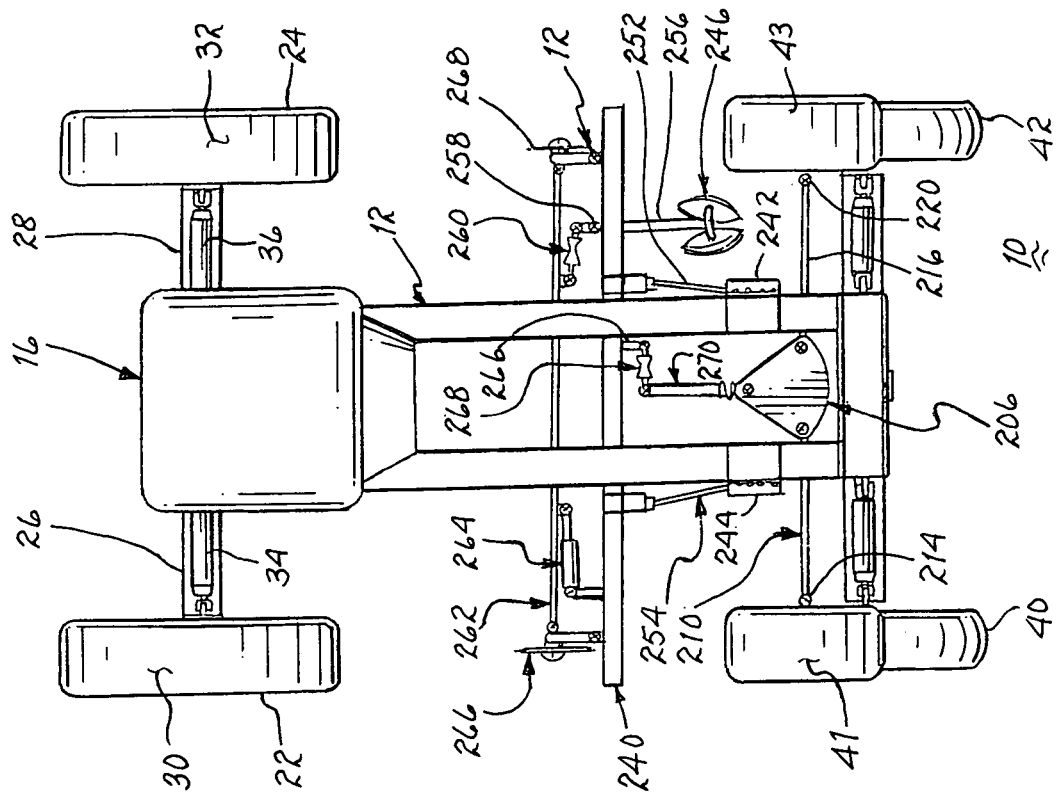
FIG. 15 illustrates an under slung toolbar for steering the tractor in response to movement of a row guide.

Conventional guidance systems for tractors are designed to steer the tractor with the expectation that the toolbar will follow. However, such result does not always occur. For example, the forces acting on the toolbar due to the implements attached thereto are translated to the tractor. These forces acting on the tractor may cause a tractor having flotation tires to drift sideways. By guiding the toolbar and having the tractor follow movement of the toolbar, such drift will be avoided. The structure illustrated in FIG. 15 will provide such an operation.

Toolbar 240 is suspended from frame 12 by clamps 242, 244 (described with reference to FIG. 9 and 10) attached to the frame and sway bars 252, 254 interconnecting the toolbar with the clamps. The sway bars accommodate limited lateral movement of the toolbar relative to the tractor. A row guide 246 is disposed at the end of an arm 256 pivotally connected to the toolbar at pivot mechanism 258. Any lateral movement of the row guide will result in pivotal movement of arm 256 and actuate a hydraulic steering valve 260 pivotally connected between the end of the arm and a common tie rod 262. Operation of the steering valve will result in extension or contraction of hydraulic steering cylinder 264 to laterally displace the common tie rod, which tie rod links steering coulters 266, 268. The resulting movement of the common tie rod creates a new direction of travel, through operation of the tractor steering mechanism, and the steering valve 260 will become repositioned to the neutral position. Thus, the movement also serves as feedback to hydraulic steering valve 260 to neutralize the flow of hydraulic fluid therethrough. As illustrated, coulters 266, 268 are offset to the rear of their steering axis. This accomplishes two results. First, toolbar 240 is immediately moved in the proper direction. Second, the direction of travel of the coulters is changed.

The steering of the tractor in response to and guided by the toolbar will be described below. A link 266 extends from toolbar 240 into operative engagement with a tractor steering valve 268. The steering valve is in operative engagement with steering plate 206 through a spring loaded guide arm 270. When the toolbar moves laterally in either direction, a commensurate movement of link 266 will occur. As the link moves, tractor steering valve 268 will deliver hydraulic fluid to hydraulic rams 232, 234 (see FIG. 14a) to cause pivotal movement of steering plate 206 and result in turning front wheels 40, 42 to alter the direction of travel of the tractor. As the steering plate pivots, the spring loaded guide arm will translate and provide mechanical feedback to tractor steering valve 268 to neutralize and reverse flow of hydraulic fluid to hydraulic rams 232, 234 until the toolbar and the direction of travel of the tractor are in positional agreement. As noted above, sway bars 252, 254 accommodate for small differences in directional input commands from the toolbar and the actual direction of travel of the tractor.

In summary, when precise guide furrows are established, controlled traffic lanes become a reality and precise guiding of the tractor along such traffic lanes becomes easier and practical.

Figure 16:
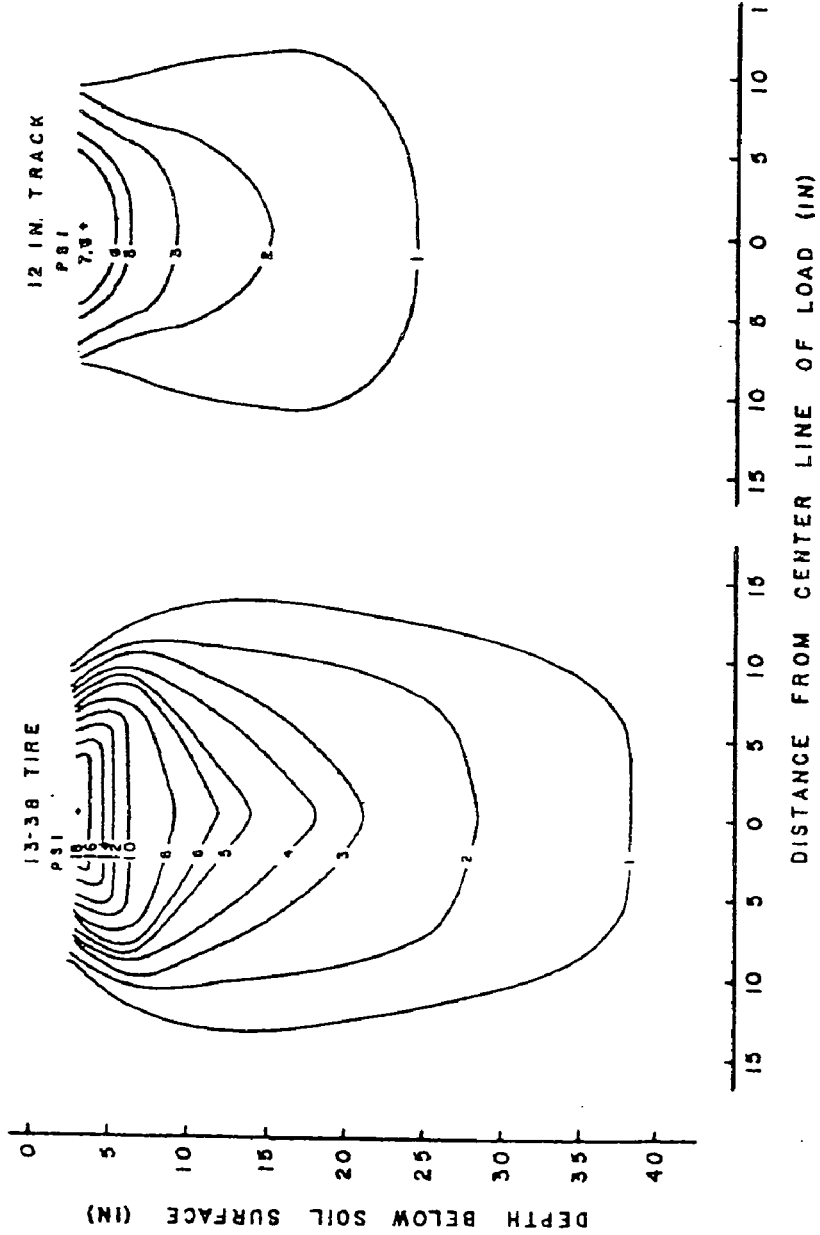
FIG. 16 illustrates a graph of soil compaction under a tractor wheel.

FIG. 16 depicts the results of studies by the U.S. Department of Agriculture relating to compaction as a function of tractor tires. For example, a 13 inch wide tire, capable of supporting a 3,500 pound load will compact an area approximately 28 inches wide. High horsepower and larger tractors may use tires that are 18.4 inches wide and even 20.8 inches wide capable of supporting a 7,000 pound load. These tires will compact an even greater width than illustrated in FIG. 16 and to a greater depth. As most tractors are designed to accommodate two (2) forty inch (40") rows of crops, it becomes evident that repeated compaction and an increased compaction width will compromise root growth of many types of crops.

FIG. 17 illustrates the compaction effect and loss of arable land as a result of use of a tractor designed to straddle two (2) forty inch (40") rows of crops. The resulting bed width is eighty inches (80"). The production zone is approximately fifty six inches (56") wide and one half of each straddling traffic zone, representing the travel of the tires, is approximately twelve inches (12") wide for a total loss of twenty four inches (24"). This represents seventy percent (70%) of tillable land and thirty percent (30%) of non tillable land. If the bed width is increased to one hundred and sixty inches (160"), as shown in FIG. 17b, the production zone will increase to one hundred thirty six inches (136") and the non tillable width will remain the same. This results in eighty five percent (85%) tillable land and only fifteen percent (15%) of non tillable land. By increasing the bed width to two hundred forty inches (240"), as shown in FIG. 17c, the production zone will increase to two hundred and sixteen inches (216"). The non tillable width will remain at twenty four (24"). The percent of tillable land will increase to ninety percent (90%) and the percentage of non tillable land is reduced to ten percent (10%). Thus, significant incentive exists for a tractor to have as wide a track as possible. To use such a wide track without compromising stability the wheel base must also be increased. To minimize loss of tillable land at the ends of rows of crops, it is beneficial to reduce the wheel base in order to achieve turns having a minimal turning radius. As a corollary to a wide bed width, such a bed width also reduces the number of passes across a field that must be made and a greater area can be tilled per time of travel. The present invention, as described above, can bring about all of these benefits.

Figure 18A:
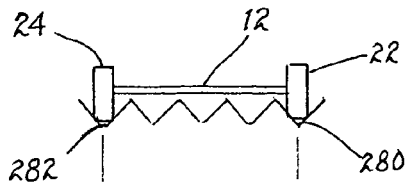
FIGS. 18a, 18b and 18c illustrate steps of extending and retracting the rear wheels to position the rear wheels within their respective traffic lanes with minimal crop damage.
Figure 18C:
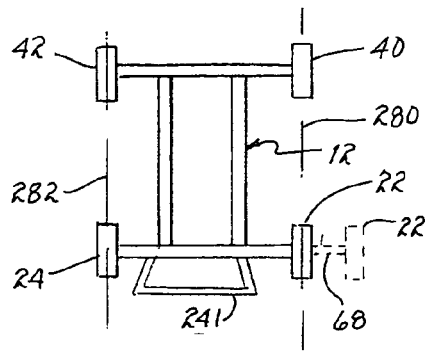
Figure 18B:
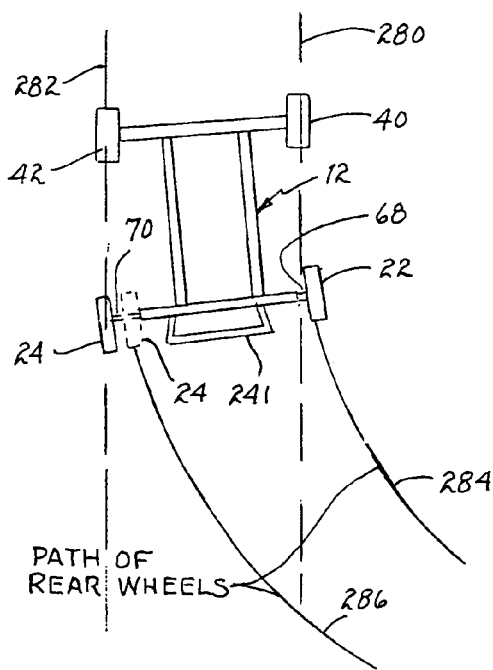

For conventional tractors making turns into existing rows, it is difficult to accurately guide the rear wheels into alignment with existing traffic lanes without excessive damage to a crop. Referring jointly to FIG. 18a, 18b and 18c, the process of aligning the front and rear wheels using the present invention to minimize crop damage will be described. FIG. 18a is a partial cross sectional view illustrating frame 12 supporting rear wheels 22, 24 located within rows 280, 282. The space between these two rows represents the area of cultivation and crops. Tracks 284, 286 represent the path of rear wheels 22, 24 as tractor 10, as represented by frame 12, turns into alignment with rows 280, 282. As shown, when front wheels 40, 42 are aligned with the rows, rear wheels 22, 24 are not in alignment with the rows. To achieve alignment of the rear wheels with the rows, rear toolbar 241 (see FIG. 10a) is lowered to the ground and thereafter the rear of the tractor is raised until at least rear wheel 24 clears the ground. Upon such clearance, rear wheel 24 is extended by extending telescoping tube 70, as described above, until the wheel becomes aligned with row 282, as illustrated. Thereafter, rear toolbar 241 is lowered to bring the rear wheels into contact with the ground. Upon such contact, telescoping tube 70 is retracted and simultaneously telescoping tube 68 is extended. Thereby, frame 12 is shifted toward rear wheel 24, as illustrated in FIG. 18c. Rear toolbar 241 is once again extended downwardly to raise the rear end of the tractor. When at least rear wheel 22 clears the ground, telescoping tube 68 is retracted to locate rear wheel 22 in alignment with row 280. Thereby, all four wheels of the tractor are aligned with their respective rows. With such alignment, any of the various guidance systems that may be incorporated can be brought into operation to maintain the tractor aligned with the respective rows for the length of the field.

Figure 19A:
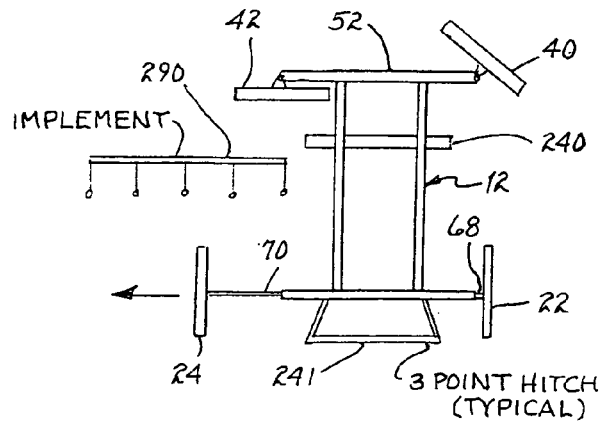
FIGS. 19a, 19b and 19c illustrate steps for attaching an implement to the toolbar mounted between the front and rear wheels.
Figure 19B:
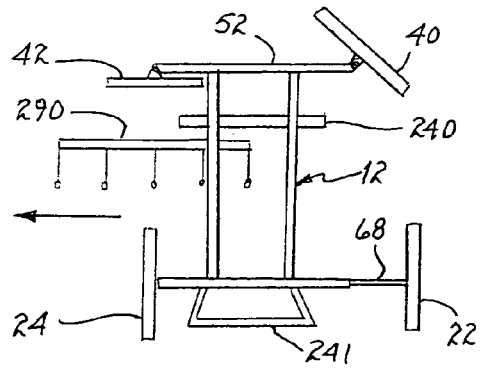
Figure 19C:
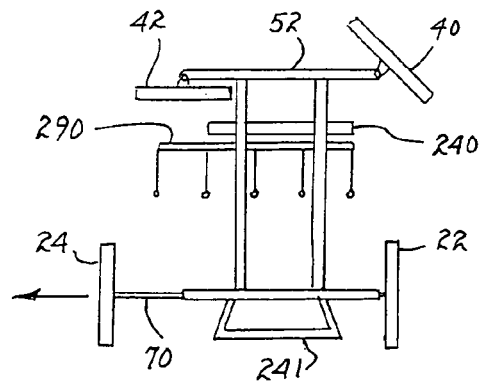

FIGS. 19a, 19b and 19c illustrate a method for installing or attaching an implement 290 to a toolbar mounted between the front and rear wheels of tractor 10, which tractor is represented by frame 12. The tractor is driven along side implement 290, as illustrated in FIG. 19a. Rear toolbar 241 (as also shown in FIG. 10a) is lowered to the ground and with further actuation of the attendant hydraulic rams, the rear of frame 12 is raised to raise rear wheels 22, 24 above the ground. Telescoping tube 70 is extended to extend rear wheel 24, as illustrated. Front wheels 40, 42 are turned until front wheel 42 permits sideways movement of the tractor, as illustrated. Hollow bar 52 is canted, as representatively shown in FIG. 4a, to raise front wheel 40 above the ground. Thereafter, rear toolbar 241 is raised to lower rear wheels 22, 24 onto the ground. By simultaneously retracting telescoping tube 70 and attendant rear wheel 24 and extending telescoping tube 68 attendant rear wheel 22, frame 12 (and the tractor) will move to the left and front wheel 42 will rotate commensurately. The result of extension and retraction of telescoping tubes 68, 70, respectively, is illustrated in FIG. 19b. This process is repeated, as representatively shown in FIG. 19c until implement 290 is adjacent the toolbar and attachment can be effected.

By reversing the above described process, detachment of the implement may be accomplished by the operator of the tractor.

From the above description, it becomes evident that the repositioning of the tractor may be accomplished by the operator remaining within the cab as he will have full view of the tractor and the implement and be able to accurately and fully align the toolbar with the implement. There is little, if any need, to have other persons present nor is other equipment necessary to attach and detach the implement.

I claim:

1. An agricultural tractor having first and second rear wheels and first and second front wheels, said tractor comprising in combination:
    a) a frame formed of square tubing;
    b) first and second square telescoping tubes extendible from said frame for housing an axle for each of the first and second rear wheels, respectively, to vary the width between the rear wheels;
    c) third and fourth square telescoping tubes extendible from a support secured to said frame for pivotally supporting each of the first and second front wheels, respectively to vary the width between the front wheels; and
    d) further telescoping tubes extendible from said frame to vary the wheel base of said tractor.

2. The agricultural tractor as set forth in claim 1 wherein said support is secured to the terminal ends of said further telescoping tubes.

3. The agricultural tractor as set forth in claim 2, including a length of square tubing pivotally secured to said support, said length of tubing being adapted to receive said third and fourth telescoping tubes.

4. An agricultural tractor having first and second rear wheels and first and second front wheels, said tractor comprising in combination:

a) a frame formed of square tubing;
b) first and second square telescoping tubes extendible from said frame for housing an axle for each of the first and second rear wheels, respectively, to vary the width between the rear wheels;
c) third and fourth square telescoping tubes extendible from a support secured to said frame for pivotally supporting each of the first and second front wheels, respectively to vary the width between the front wheels;
d) further telescoping tubes extendible from said frame to vary the wheel base of said tractor, said support being secured to the terminal ends of said further telescoping tubes;
e) a length of square tubing pivotally secured to said support, said length of tubing being adapted to receive said third and fourth telescoping tubes; and
f) hydraulic rams for controlling the pivotal relationship in a vertical plane between said support and said length of tubing.

5. The agricultural tractor as set forth in claim 1, including a pivot mechanism interconnecting said support with said frame for accommodating differences in elevation of said first and second front wheels.

6. An agricultural tractor having first and second rear wheels and first and second front wheels, said tractor comprising in combination:
a) a frame formed of square tubing;
b) first and second square telescoping tubes extendible from said frame for housing an axle for each of the first and second rear wheels, respectively, to vary the width between the rear wheels;
c) third and fourth square telescoping tubes extendible from a support secured to said frame for pivotally supporting each of the first and second front wheels, respectively, to vary the width between the front wheels;
d) a pivot mechanism interconnecting said support with said frame for accommodating differences in elevation of said first and second front wheels;
e) hydraulic rams for causing pivotal movement of said support relative to said frame; and
f) further telescoping tubes extendible from said frame to vary the wheel base of said tractor.

7. The agricultural tractor as set forth in claim 1, including a first pivot mechanism disposed at the terminal end of said third telescoping tube for supporting said first front wheel, a second pivot mechanism disposed at the terminal end of said fourth telescoping tube for supporting said second front wheel.

8. The agricultural tractor as set forth in claim 7 wherein said first and second rear wheels rotate about a common axis of rotation, wherein said first front wheel rotates about a first axis of rotation and said second front wheel rotates about a second axis of rotation and including a steering mechanism for said first and second front wheels, said steering mechanism being adapted to cause the first and second axis of rotation to intercept one another along said common axis of rotation whenever said first and second front wheels are turned left or right off dead center.

9. An agricultural tractor having first and second rear wheels and first and second front wheels, said tractor comprising in combination:
a) a frame formed of square tubing;
b) first and second square telescoping tubes extendible from said frame for housing an axle for each of the first and second rear wheels, respectively, to vary the width between the rear wheels;
c) third and fourth square telescoping tubes extendible from a support secured to said frame for pivotally supporting each of the first and second front wheels, respectively, to vary the width between the front wheels;
d) a first pivot mechanism disposed at the terminal end of said third telescoping tube for supporting said first front wheel, a second pivot mechanism disposed at the terminal end of said fourth telescoping tube for supporting said second front wheel;
e) said first and second rear wheels rotating about a common axis of rotation, said first front wheel rotating about a first axis of rotation and said second front wheel rotating about a second axis of rotation and including a steering mechanism for said first and second front wheels, said steering mechanism being adapted to cause the first and second axis of rotation to intercept one another along said common axis of rotation whenever said first and second front wheels are turned left or right off dead center;
f) said steering mechanism including a pivoting member, a first set of links attached to said pivoting member at a first location and interconnecting with said pivot mechanism of said first front wheel and a second set of links attached to said pivoting member at a second location and interconnecting with said second pivot mechanism of said second front wheel, said first and second locations being displaced from one another and coincident with different radials extending from the pivot axis of said pivoting member; and
g) further telescoping tubes extendible from said frame to vary the wheel base of said tractor.

10. The agricultural tractor as set forth in claim 9 wherein said pivoting member is a triangular plate including three apices and having the pivot axis proximate one apex, each of said first and second sets of links being pivotally attached proximate one of the remaining apices.

11. An agricultural tractor having first and second rear wheels and first and second front wheels, said tractor comprising in combination:
a) a frame formed of square tubing;
b) first and second square telescoping tubes extendible from said frame for housing an axle for each of the first and second rear wheels, respectively, to vary the width between the rear wheels;
c) third and fourth square telescoping tubes extendible from a support secured to said frame for pivotally supporting each of the first and second front wheels, respectively, to vary the width between the front wheels;
d) first and second hydraulic rams for extending and retracting said first and second telescoping tubes and third and fourth hydraulic rams for extending and retracting said third and fourth telescoping tubes; and
e) further telescoping tubes extendible from said frame to vary the wheel base of said tractor.

12. An agricultural tractor having first and second rear wheels and first and second front wheels, said tractor comprising in combination:
a) a frame formed of square tubing;
b) first and second square telescoping tubes extendible from said frame for housing an axle for each of the first and second rear wheels, respectively, to vary the width between the rear wheels;
c) third and fourth square telescoping tubes extendible from a support secured to said frame for pivotally supporting each of the first and second front wheels, respectively, to vary the width between the front wheels;

d) further telescoping tubes extendible from said frame to vary the wheel base of said tractor; and e) hydraulic rams for extending said further telescoping tubes.

13. The agricultural tractor as set forth in claim 12, including first and second hydraulic rams for extending and retracting said first and second telescoping tubes and third and fourth hydraulic rams for extending and retracting said third and fourth telescoping tubes.

\* \* \* \* \*